United States Patent [19]

Tibbetts et al.

[11] Patent Number: 5,413,773
[45] Date of Patent: May 9, 1995

[54] METHOD FOR FORMING CARBON FILTERS

[75] Inventors: Gary G. Tibbetts, Birmingham; Daniel W. Gorkiewicz, Washington, both of Mich.; Robert L. Alig, Dayton, Ohio

[73] Assignee: General Motors Corporation, Detroit, Mich.

[21] Appl. No.: 82,530

[22] Filed: Jun. 28, 1993

Related U.S. Application Data

[63] Continuation of Ser. No. 709,259, Jun. 3, 1991, abandoned, which is a continuation-in-part of Ser. No. 594,540, Oct. 9, 1990, Pat. No. 5,024,818.

[51] Int. Cl.⁶ .................................. D01F 9/127
[52] U.S. Cl. ........................................ 423/447.3
[58] Field of Search ................................ 423/447.3

[56] References Cited

U.S. PATENT DOCUMENTS

| | | | |
|---|---|---|---|
| 1,823,503 | 9/1931 | Mittasch et al. | 585/539 |
| 2,796,331 | 6/1957 | Kauffman et al. | 423/447.3 |
| 3,183,277 | 5/1965 | Scherer et al. | 260/653.5 |
| 3,375,308 | 3/1968 | Turkat | 264/29 |
| 3,411,949 | 11/1968 | Hough | 117/228 |
| 3,664,813 | 5/1972 | Hollander, Jr. | 23/209.1 |
| 4,336,229 | 6/1982 | Wunderlich et al. | 422/148 |
| 4,391,787 | 7/1983 | Tibbetts | 423/447.3 |
| 4,491,569 | 1/1985 | Tibbetts | 423/447.3 |

(List continued on next page.)

FOREIGN PATENT DOCUMENTS

| | | | |
|---|---|---|---|
| 222492 | 5/1987 | European Pat. Off. | |
| 2338357 | 2/1974 | Germany | |
| 57-58966 | 4/1982 | Japan | |
| 61-146816 | 7/1986 | Japan | 423/447.3 |

(List continued on next page.)

OTHER PUBLICATIONS

Endo et al, "Vapor Grown Carbon Fibers Obtained by Fluid Ultra Fine Catalytic Particles," *Extended Abstracts*, 17th Bi-Ann Conf on Carbon, 1985, Lexington, Ky., pp. 295-296.

Hatano et al, "Graphite Whiskers by New Process and their Composites," 30th National SAMPE Symposium, Anaheim, Calif., 1985, pp. 1467-1476.

Katsuki et al, "Formation of Carbon Fibers from Naphthalene on Some Sulfur-Containing Substrates," *Carbon*, vol. 19 (1981), pp. 148-150.

(List continued on next page.)

Primary Examiner—Gary P. Straub
Assistant Examiner—Stuart L. Hendrickson
Attorney, Agent, or Firm—George A. Grove

[57] ABSTRACT

In a preferred embodiment, an apparatus and method for forming carbon fibers in a gas phase reaction is disclosed wherein a reactor defines a reaction chamber with a closed end and an outlet and a reactant feed tube which extends generally axially therewithin. Gaseous reactants are injected into the reactor through an opening of the feed tube. The feed tube and chamber are constructed and arranged to define a passageway which is a gas flow path. The reactor includes purge means for intermittently and forcibly moving any fibers clogging the passageway out of the reactor, and means for intermittently oxidizing carbonaceous material in the passageway of the reactor. In use, a period of fiber formation is followed by a forced purge. Periodically, an oxidation purge is used to essentially cleanse the reactor.

7 Claims, 2 Drawing Sheets

U.S. PATENT DOCUMENTS

| | | | |
|---|---|---|---|
| 4,565,684 | 1/1986 | Tibbetts et al. | 423/447.3 |
| 4,572,813 | 2/1986 | Arakawa | 264/29.2 |
| 4,749,557 | 1/1988 | Yetter et al. | 423/447.3 |
| 4,816,289 | 3/1989 | Komatsu et al. | 423/447.3 |
| 4,876,078 | 10/1989 | Arakawa et al. | 423/447.3 |
| 5,102,647 | 4/1992 | Yamada et al. | 423/447.3 |

FOREIGN PATENT DOCUMENTS

| | | | |
|---|---|---|---|
| 62-62914 | 3/1987 | Japan. | |
| 01-40621 | 2/1989 | Japan | 423/447.3 |
| 01-301506 | 12/1989 | Japan. | |
| 86/04937 | 8/1986 | WIPO. | |

OTHER PUBLICATIONS

Okada et al, "Influence of Gas Composition on the Formation of Vapor Grown Carbon Fiber," *Extended Abstracts*, 19th Bi–Ann Conf on Carbon, University Park, Calif. (1989), pp. 422–423.

Tibbetts et al, "Mechanical Properties of Vapour–Grown Carbon Fibers," *J. Phys. D: Appl. Phys.*, vol. 20 (1987), pp. 292–297.

Tibbetts et al, "An Adsorption–Diffusion Isotherm and Its Application to the Growth of Carbon Filaments on Iron Catalyst Particles," *Carbon*, vol. 25, No. 3 (1987), pp. 367–375.

Tibbetts et al, "High Temperature Limit for the Growth of Carbon Filaments on Catalytic Iron Particles," *Mat. Res. Soc. Symp. Proc.*, vol. 111 (1988), pp. 49–52.

U.S. Ser. No. 07/594,540 filed Oct. 9, 1990, allowed Jan. 19, 1991.

METHOD FOR FORMING CARBON FILTERS

Reference to Co-Pending Application

This is a continuation application of U.S. Ser. No. 07/709,259 filed on Jun. 3, 1991, now abandoned, which is a continuation-in-part of application Ser. No. 07/594,540 filed Oct. 9, 1990, now U.S. Pat. No. 5,024,818.

FIELD OF THE INVENTION

This invention relates to forming carbon fibers and more particularly to an apparatus and method for making carbon fibers in a gas phase reaction.

BACKGROUND OR THE INVENTION

Carbon fibers are used to make composite materials. Such carbon composites provide the advantages of relatively high strength and low weight as compared to other materials commonly used to form articles such as automotive, boat, airplane and other parts. High strength and low weight are key advantages needed to reduce vehicle fuel consumption and increase fuel economy. The strength of the composite is directly related to the quality of the carbon fibers. Preferred fibers have basal planes arranged in concentric circles and are of microscopic size for improved strength-to-weight ratio. Such microscopic fibers effectively achieve the advantages of improved strength, low weight and, therefore, improved fuel economy.

Prior methods of forming fibers basically consist of conducting a gas phase batch reaction in a vessel. Specifically such methods include dispensing iron particles, in the form of a powder or in a solution, into a vessel while simultaneously dispensing a liquid or gas hydrocarbon compound, then decomposing the hydrocarbon compound to form carbon-containing compounds which react with the iron particles. A diluent gas, such as hydrogen, is injected into the vessel to control the rate at which decomposition and growth proceed.

Prior methods and vessels typically include a preconditioning period and a post-formation period. During the preconditioning period, the surface of the vessel is prepared using iron particles and/or the vessel is preheated before the reaction is initiated. During the post-formation period, the vessel is disassembled to remove fibers and unreacted compounds. The effort required for preparation, and particularly for post-formation, is typically extensive in relation to the amount of product produced. Such methods are not cost effective for use in commercial scale plants.

Therefore, it would be desirable to have an apparatus and method which form carbon fibers in a generally continuous process and which provide a consistently high yield of fibers of desired dimensions.

SUMMARY OF THE INVENTION

In the preferred embodiment, there is provided an apparatus for forming carbon fibers in a continuous gas phase process by reacting a carbonaceous compound in the presence of nuclei entrained in a gas stream. Each of the nuclei is a catalyst about which carbon fiber growth occurs. The apparatus comprises a reactor and reactant feed tube constructed to provide a continuous gas flow path. The reactor defines a reaction chamber with a first end which is closed and a second end with an outlet. The reactant feed tube is disposed in the reactor and extends generally axially therein. Gaseous reactants are injected into the reactor through an opening of the feed tube. Preferably, the tube and reactor chamber are radially spaced and concentric. In one embodiment, the feed tube may encompass a capillary tube which supplies a vaporizable liquid reactant. The reactor and feed tube are each elongate and of a material which is relatively resistent to heat and corrosion, preferably a ceramic material.

In order to supply the necessary heat for the reaction, the apparatus has means for heating the reactor to establish a hot zone for thermal decomposition within the chamber adjacent the opening of the feed tube. A relatively cool zone is adjacent the reactor outlet.

The apparatus also has means for continuously supplying a gaseous reactant stream to the feed tube at a rate sufficient to entrain the nuclei within the gas stream, to minimize thermophoretic deposition of the nuclei, and to disperse the nuclei in the reactor hot zone. The gaseous reactant stream may include a vaporizable constituent.

To facilitate fiber growth, the reactor chamber has an average cross sectional area substantially greater than the average cross sectional area of the feed tube. Since the reactor chamber has a much greater average cross sectional area than the feed tube, it accommodates the gas stream at a reduced flow rate suitable for sustained fiber growth and thickening.

The apparatus includes means for collecting carbon fibers from the exhaust gas which exits the reactor outlet. Preferably, the fibers are compacted as they are collected.

In order to move essentially all fibers out of the reactor, the apparatus includes means for a forced purge. The forced purge immediately follows a period of fiber formation. In the forced purge, preferably a source of gas devoid of carbon-containing material is intermittently injected under pressure into the reactor so as to cause movement or blowing of fibers out of the reactor. Preferably, a gas such as air, helium or nitrogen is intermittently fed under pressure through the feed tube and through the chamber. Alternatively, the forced purge may include mechanical means to cause removal of the fibers.

In order to remove any remaining fibers and any other constituents such as unreacted carbonaceous material, the invention includes means for an oxidative purge. Preferably the oxidation purge follows or coincides with the forced purge. During the oxidation purge, a source of oxygen, preferably air, is injected through the feed tube. The forced and oxidation purge steps are relatively short, convenient and economical and permit the attainment of consistently high yield during the subsequent fiber formation steps.

In a preferred method, either a horizontal or a vertical reactor may be used to form carbon fibers by: (a) forming a mixture comprising a gaseous carbonaceous compound and a compound decomposable to form nuclei and flowing the mixture through the reactor at a first pressure; (b) heating the mixture for a time and at a temperature sufficient to thereby form carbon fibers; (c) intermittently interrupting the flow of the mixture of step (a) and flowing a gas stream substantially devoid of carbonaceous material through the reactor at a pressure at least as great as the first pressure so as to forcibly move at least a portion of any of the fibers plugging the passageway out of the reactor; and (d) continuously recovering the fibers formed in the reactor. The pressurized gas preferably consists essentially of a gas selected from the group of air or inert gases such as helium, argon and nitrogen and is substantially devoid of carbonaceous material. Preferably, the oxygen purge step immediately follows the pressurized purge step.

In another preferred method, fibers are preferably formed in a reactor having an inlet, outlet and passageway therebetween by: (a) forming a stream continuously flowing in a first reactor passage, the stream comprising a gaseous carbonaceous compound and a compound decomposable to form nuclei; (b) heating the stream in the first reactor passage to a first temperature and for a time sufficient to at least partially decompose the decomposable compound; (c) expanding the stream into a second reactor passage larger than the first and concentric therewith so as to cause the stream in the second reactor passage to flow in a direction counter to the direction of flow in the first reactor passage and heating the stream in the second reactor passage to a second temperature and for a time sufficient to form carbon fibers; and (d) continuously recovering the fibers formed in the reactor.

In this method, in a vertical reactor the first direction is preferably upward and the second direction is preferably downward. After step (d), the forced purge and oxygen purge steps may immediately follow.

Fibers formed according to the invention have basal planes arranged in concentric circles and are microscopic in size. The fibers are in the range of 20 to 100 nanometers in diameter (microscopic) and have a length of at least several micrometers. The fibers pack so loosely in a fibrous matrix that their apparent bulk density is in the range of 0.001 to slightly over 0.02 grams per cubic centimeter and preferably have a density below 0.01 grams per cubic centimeter.

It is an object of this invention to provide a generally continuous process and apparatus for forming carbon fibers in a gas phase reaction, to improve the process of forming carbon fibers by providing an apparatus constructed and arranged to achieve optimum conditions for forming microscopic carbon fibers in a gas phase reaction, to maintain essentially steady state, controlled reaction conditions in a continuous flow process in which microscopic carbon fibers are formed, to minimize convective currents, and to minimize thermophoretic losses of feedstock-reactant material. It is also an object to provide a method and apparatus which produces an increased yield of carbon fibers, provides a larger proportion of smaller fibers, substantially eliminates soot, and decreases the cost of producing carbon fibers.

It is a further object to provide a method and apparatus which permits fibers and unreacted compounds to be removed easily, quickly and without disassembling the vessel.

DETAILED DESCRIPTION OF THE PREFERRED EMBODIMENT

Figures 1, 2:
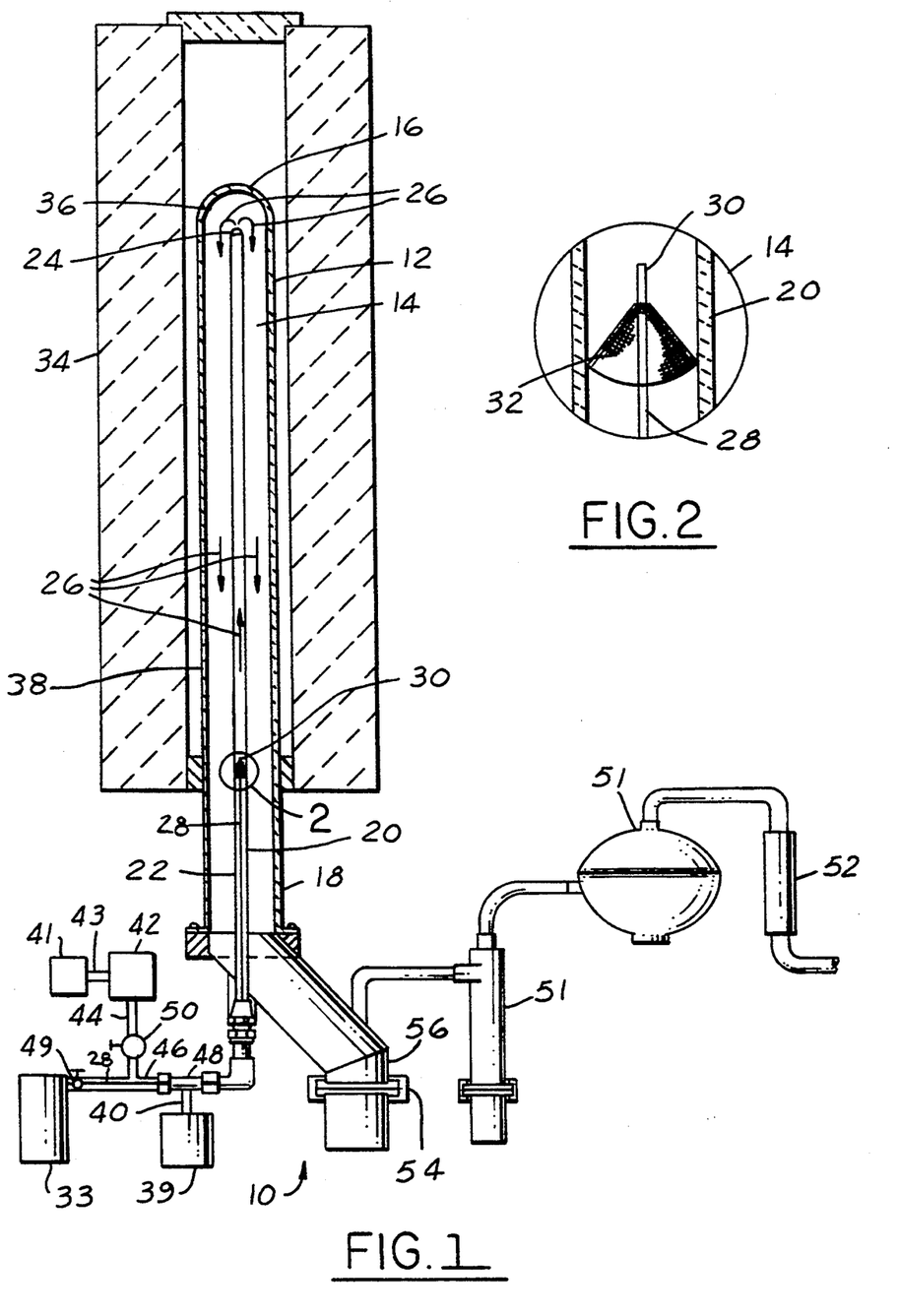
FIG. 1 is a diagrammatic cross sectional view of an apparatus embodying this invention with a reactor defining a vertical reaction chamber and a reactant feed tube extending axially therein.
FIG. 2 is a fragmentary exploded view of the encircled portion of FIG. 1.
Figure 3:
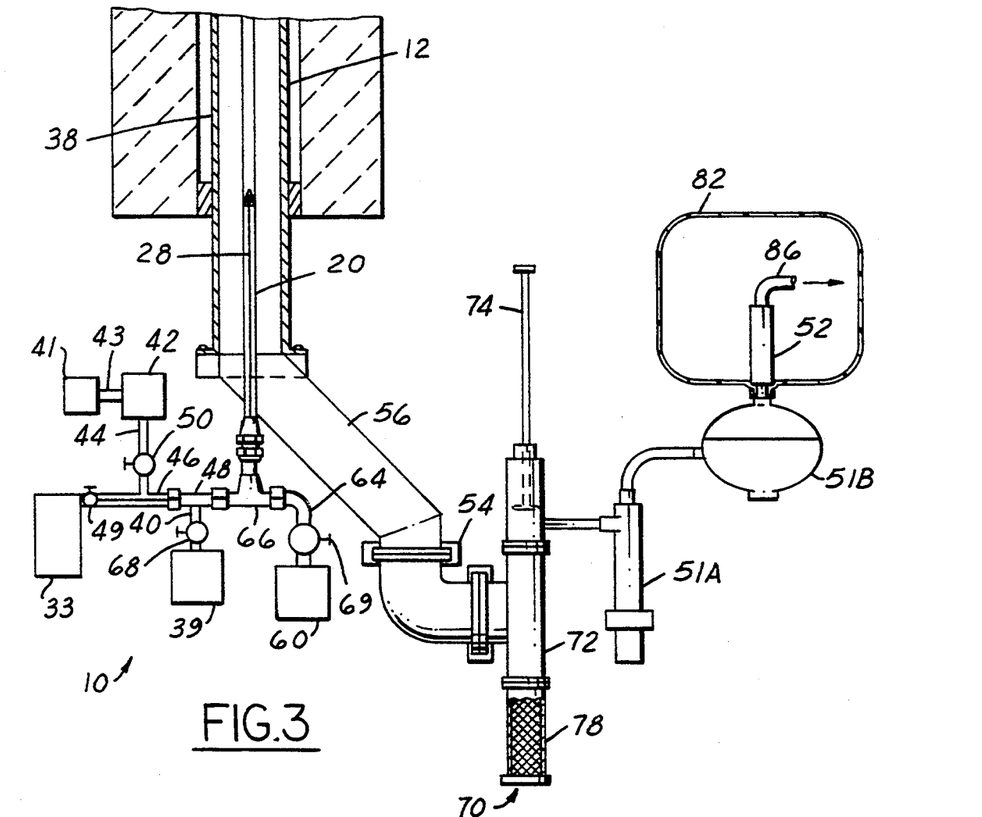
FIG. 3 is a fragmentary diagrammatic cross sectional view of another embodiment of a reactor.

FIGS. 1 through 4 illustrate a preferred apparatus 10 for forming carbon fibers by a continuous gas phase process comprising reaction of a gaseous carbonaceous compound in the presence of nuclei entrained in a gas stream. As shown in FIGS. 1, 2 and 3, apparatus 10 includes a reactor 12 defining a chamber 14 with an axis, a first end 16 which is closed and a second end 17 with an outlet 18. Gaseous reactants are injected into the reactor 12 by a reactant feed tube 20 which is disposed in the chamber 14 and extends generally axially therein. The feed tube 20 has an inlet 22 at one end and a discharge opening 24 at the other end spaced from the reactor closed end 16. The opening 24 of the feed tube 20 is adjacent the closed end 16 and the feed tube 20 extends more than ¼ of the axial length of the reactor. Desirably, the feed tube extends at least ½ of the axial length of the reactor and preferably ¾ of the length thereof.

A gas flow path or passageway 26, defined by the gas feed tube 20 and reactor 12, extends generally axially through the feed tube 20 into the chamber 14 and thereafter generally axially through the chamber 14. Desirably, the reactor 12 defines a tubular, thermal reaction chamber 14 which is substantially concentric with the opening 24. Preferably, the chamber 14 is radially spaced from the feed tube 20 and concentric therewith throughout its entire axial extent. Desirably, the reactor 12 and feed tube 20 are each elongate, that is, each has a length greater than its diameter.

If it is desired to supply a vaporizable liquid reactant, a capillary tube 28 may be used to supply the vaporizable liquid reactant through a discharge end 30 thereof. Capillary tube 28 is disposed within the feed tube 20 and concentric therewith. In order to provide surface area from which any droplets of vaporizable liquid reactants will vaporize, a web 32 or screen preferably of metal, such as stainless steel, is disposed around the capillary tube 28 adjacent its discharge end 30 within the feed tube 20 (FIG. 2). Desirably, the liquid includes the nuclei and is supplied to capillary tube 28 from pump 33.

In order to supply the necessary heat for the reaction, the apparatus 10 has heating means such as a heater or furnace 34 to heat the reactor 12 to establish a hot zone 36 within the chamber 14 adjacent the close end 16. The temperature of the hot zone 36 is sufficient to sustain carbon fiber growth. There is a relatively cool zone 38 adjacent the reactor outlet 18. The hot zone 36 adjacent the closed end 16 of the chamber 14 and the cool zone 38 adjacent the reactor outlet 18 establish a thermal gradient within the reactor 12 to minimize convective currents within the reactor.

In FIGS. 1 and 3, the gas flow path or passageway 26 has a first portion flowing in a first direction and a second portion flowing in a second direction. The first portion flows generally axially upward, the second portion flows generally axially downward, and the first end 16 which is closed is disposed above the second end 17 which has the outlet 18.

The minimizing of connective currents is rather dramatically evident in the vertical reactor of FIGS. 1 and 3 where hot gases are disposed over cold gases.

Preferably, the temperature of the hot zone 36 is sufficient to decompose any of a variety of gaseous carbonaceous compounds which may include, for example, one or more vaporizable hydrocarbons. Thus the reactor 12 defines a thermal decomposition or pyrolysis chamber 14. Desirably, a first temperature is maintained adjacent the inlet 22, a second temperature, greater than the first temperature, is maintained within the hot zone 36 and a third temperature, less than the second temperature, is maintained adjacent the outlet 18. Desirably, the inlet 22 is at an ambient temperature, the hot zone 36 is at a temperature greater than 1000° C. and the outlet 18 is at a temperature between ambient and 1000° C. Preferably, a temperature over 1050° C. is maintained near zone 36.

In order to establish a desired temperature condition, preferably the furnace 34 is an electric furnace which encompasses at least a portion of the reactor 12, the opening 24 of the feed tube 20 and a portion of the chamber 14 adjacent thereto. The furnace 34 is arranged to transfer heat to the chamber 14, which in turn transfers heat to the feed tube 20.

The reactor 12 and feed tube 20 are each constructed of a material which is relatively resistant to heat and corrosion. Suitable materials include nickel or high temperature steel, quartz, ceramic and refractory materials. Desirably, a refractory such as alumina or mullite is used. Preferably, mullite is used, which is a silicate of aluminum. Mullite is more resistant to corrosion than stainless steel, and it has better heat transfer properties than quartz. Mullite is better able to withstand the temperature shock that occurs when liquid is injected.

The apparatus 10 comprises means for continuously supplying a gaseous reactant stream into the feed tube 20 at a rate sufficient to entrain the nuclei within the stream and disperse the nuclei into the reactor hot zone 36. Preferably, pressurized or compressed gas is used, supplied from compression and flow control system 39, and then through line 40. Specifically, the gaseous reactant stream must move at a velocity sufficient to entrain the nuclei within the gas stream for dispersion into the reactor hot zone 36. If it is desired to supply nuclei entrained in a gas stream at inlet 22 of feed tube 20 rather than nuclei in a liquid, a pressurized gas is supplied from compression and flow control system 41. The gas is then bubbled through a reservoir 42 which holds a liquid such as iron carbonyl from which nuclei may be formed. Line 43 connects system 41 to reservoir 42. This forms a gas/nuclei mixture which is then supplied from reservoir 42 through line 44 by gas pressure rather than a pump and then through line 46 to tee 48 where it mixes with gas in line 40 before entering feed tube 20 at inlet 22. Valve 49 is closed when nuclei are supplied through line 44 and valve 50 is closed when nuclei are supplied through capillary tube 28. When gaseous reactants are provided through lines 44 and 40 to feed tube 20, apparatus 10 may be operated with valve 49 closed; in addition, apparatus 10 may be operated without capillary tube 28, web 32 and pump 33.

In order to provide desired conditions for microscopic fiber growth, the reaction chamber 14 has an average cross sectional area substantially greater than the average cross sectional area of the feed tube. Desirably, the reactor chamber 14 has an inside diameter at least three times greater than the diameter of the opening 24 and preferably five times greater. By this arrangement, gas moves quickly through the inlet 22, is warmed in feed tube 20, and then moves into the hot zone 36, where it expands and is dispersed and scattered remote from the surfaces within the hot zone 36. The expanded gas stream then moves slowly through the chamber 14 for an extended time at a reduced flow rate suitable for sustained fiber growth. Preferably, the velocity of the reactant stream in the feed tube 20 is at least 10 cm/s, and this velocity is at least nine times greater than the velocity of the expanded portion of the stream in the chamber 14.

The reactor 12 includes means for collecting carbon fibers from exhaust gas exiting the outlet 18, which desirably comprises first and second cyclone type separators 51A, 51B and at least one filter 52 for trapping the microscopic carbon fibers. Preferably, a portion of the fibers is first collected in a trap 54 adjacent the outlet 18 at the bottom of an angled exhaust line 56, and then the rest is collected by two cyclones 51 separately in series (FIG. 1).

As shown in FIG. 3, the apparatus in one embodiment includes means to move any remaining fibers out of the reactor in a forced purge step. The forced purge step immediately follows a period of fiber formation. Preferably, the forced purge uses pressurized gas such as air, helium, nitrogen or argon, supplied in short bursts from compression and flow control system 60 through line 64 to tee 66 and then through feed tube 20. Alternatively, the forced purge may include use of mechanical means such as turning screw or brush to ream the remaining fibers out of the reactor, or a moving, jointed belt to accomplish the same end.

If it is desired to oxidize carbonaceous material remaining after a forced purge, then an oxidation purge may immediately follow. The oxidation purge is particularly useful to remove excessively long fibers which may have grown into a matrix formation, thus plugging the opening 24 of the feed tube 20. Air is supplied from compression and flow control system 60 through line 64 to tee 66 and then through feed tube 20 for a period of time sufficient to oxidize fibers and other oxidizable constituents from surfaces of the feed tube 20 and reactor 12.

As shown in FIG. 3, tee 66 joins tee 48 and lines 64 and 20 so that flow may be supplied to line 20 through one or both of tee 48 and line 64, depending on the position of valves 49, 50 and 68, which control supply through tee 48, and valve 69, which controls supply through line 64.

As shown in FIG. 3, fiber collection means of the apparatus include a cylindrical section 70 disposed between the exhaust line 56 and the separators 51A, 51B. Preferably, the cylindrical section 70 includes a vertical pipe 72 with an axial plunger 74 which compacts fibers into a removable container 78 distal of the plunger 74. If desired, a flexible, expandable container such as bag 82 encompasses at least filter 52 of the fiber collection system to collect fibers remaining in the exhaust downstream of the second cyclone 51B and filter 52. As shown in FIG. 3, the bag 82 encompasses both filter 52 and the outlet pipe 86, and the bag 82 expands over a period of time. At suitable intervals, the bag 82 is removed and replaced.

Figure 4:
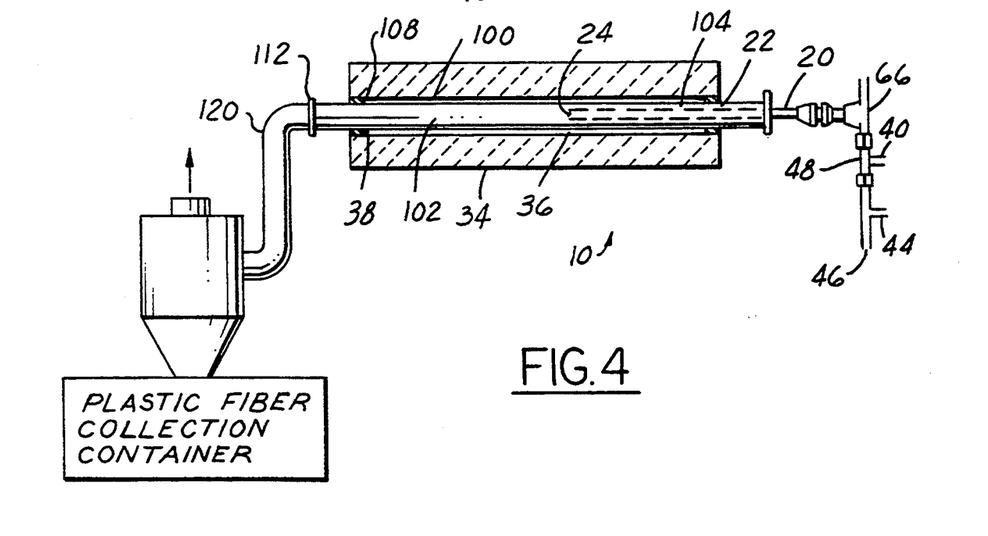
FIG. 4 is a diagrammatic cross sectional view of a reactor defining a horizontal reaction chamber and a reacted feed tube extending axially therein.

As shown in FIG. 4, the reactor 100 is disposed generally horizontally. The reactor 100 defines a chamber 102 with an axis and first and second ends 104, 108. The inlet 22 of feed tube 20 enters through a first end 104 which is closed and the tube 20 extends axially toward the second end 108. Second end 108 has an outlet 112 joined to an exhaust line 120.

As shown in FIG. 4, the outlet 112 is distal of the inlet 22 of feed tube 20. A relatively cool zone 38 is adjacent the outlet 112. A relatively hot zone 36 is adjacent the first end 104 and adjacent at least a portion of the opening 24 of feed tube 20. Accordingly, the furnace 34 encompasses at least a portion of the reactor 100, the opening 24 of the feed tube 20 and a portion of the chamber 102 adjacent thereto.

As described earlier, when gaseous reactants (carbonaceous material) and nuclei are supplied through lines 44 and 40 to feed tube 20, the apparatus may be operated with valve 49 closed. The apparatus may also be operated without capillary tube 28, web 32 and pump 33, as shown in FIG. 4, when it is not necessary to inject liquid through capillary tube 28.

In a preferred method, either a horizontal or vertical reactor may be used to form carbon fibers by: (a) forming a mixture comprising a gaseous carbonaceous compound and a compound decomposable to form iron nuclei and flowing the mixture through the reactor at a first pressure; (b) heating the mixture for a time and at a temperature sufficient to thereby form carbon fibers; (c) intermittently interrupting the flow of the mixture of step (a) and during the interruption, flowing a gas stream consisting essentially of at least one gas selected from a group consisting of air, helium, nitrogen and argon, through the reactor at a second pressure greater than the first pressure so as to forcibly move at least a portion of any fibers plugging the passageway out of the reactor; (d) immediately after step (c) and during the interruption, flowing an oxygen-containing gas substantially devoid of carbonaceous material through the reactor at a third pressure for a time and at a temperature sufficient to oxidize at least a portion of any carbonaceous material in the reactor; and (e) substantially continuously recovering the fibers formed in the reactor.

Another preferred method of forming carbon fibers in a reactor includes the steps of: (a) forming a continuous stream flowing through the reactor at a first velocity and a first pressure, the stream comprising a gaseous carbonaceous compound and a compound decomposable to form iron nuclei; (b) heating the stream to a first temperature and for a time sufficient to at least partially decompose the decomposable compound; (c) changing the velocity of the stream to a second velocity less than the first velocity and heating the stream to a second temperature and for a time sufficient to thereby form carbon fibers; (d) intermittently interrupting the flow of the stream of step (a) and during the interruption, flowing a gas stream substantially devoid of carbonaceous material through the reactor at a second pressure at least as great as the first pressure so as to forcibly move at least a portion of any fibers plugging the passageway out of the reactor; (e) immediately after step (d) and during the interruption, flowing an oxygen-containing gas substantially devoid of carbonaceous material through the reactor at a third pressure for a time and at a temperature sufficient to oxidize at least a portion of any carbonaceous material in the reactor; and (f) substantially continuously recovering the fibers formed in the reactor.

Preferably, a vertical reactor is used so that the stream flowing at the first velocity flows generally upward, is expanded and then flows at a second velocity generally downward, so that an optimum flow rate suitable for fiber growth is achieved. Preferably, the third pressure is less than the second pressure and the gas of steps (d) and (e) is air.

The apparatus and method of the invention were used to form microscopic carbon fibers in accordance with the following examples which are meant to be illustrative and not limiting.

EXAMPLE 1

The apparatus 10 of the invention, as shown in FIGS. 1 and 2, was used to form carbon fibers. The apparatus 10 included a reactor 12 of a mullite material defining a 13 centimeter ID reaction chamber 14 and a feed tube 20 of mullite with a 19 mm ID. The closed end 16 of the reactor 12 extended about 102 cm into the furnace 34. The feed tube 20 was extended into the reactor chamber 14, so that the opening 24 of the feed tube 20 was spaced about seven centimeters from the reactor closed end 16. In this position the feed tube 20 extended about 94 cm into the chamber 14. The feed tube 20 encompassed a 0.5 mm or somewhat larger diameter capillary tube 28 which had a discharge end 30 adjacent the inlet 22 of the feed tube 20 concentric therewith. The capillary tube 28 extended about three centimeters into the furnace 34 and was spaced about 99 cm from the reactor closed end 16. Metal nuclei of iron were formed from an iron compound, ferrocene, which was dissolved in hexane to form a solution. To make the hexane/ferrocene solution, 2.5 grams of ferrocene were dissolved in hexane, producing a total volume of 100 cc; this solution was pumped through the capillary tube 28 and into the feed tube 20. In order to provide warm surface area from which any droplets of liquid solution would vaporize, a stainless steel web 32 was placed around the capillary tube 28 adjacent its discharge end 30 and disposed between the capillary tube 28 and the feed tube 20. Any droplets of liquid which wet the web 32 were vaporized.

The gaseous stream was injected into the feed tube 20 at a pressure of about 760 Torr. The flow rates of the reactants were measured at 22° C. and 760 Torr pressure. The gaseous flow rates for the various constituents were approximately as follows: hexane/ferrocene at 4.5 cc/min; air at 2000 cc/min; methane at 2500 cc/min; and hydrogen sulfide at 9 cc/min.

The total flow rate was varied while maintaining the proportionality of the reactants described immediately above. Microscopic carbon fibers were formed having a diameter in the range of 50 to 100 nanometers and a length of several micrometers with a density in the range of 0.0009 to 0.014 grams per cubic centimeters. At a total flow rate of about 10,000 cc/min, a yield of 36 percent was obtained, and the fibers had a density of about 0.009 grams per cubic centimeter. The density was relatively high.

TABLE 1

| Example # | ID of Reactor | ID of Mullite Feed Tube | Type of Feed Tube | Orientation of Reactor | Average Yield | Product Density (grams/cc) |
| --- | --- | --- | --- | --- | --- | --- |
| 1 | 13 cm | 19 mm | Mullite | Vertical | 36% | 0.009 |
| 2 | 13 cm | 19 mm | Mullite | Vertical | >35% | 0.002 |
| 3 | 10 cm | 19 mm | Mullite | Horizontal | 23% | 0.003 |

TABLE 1-continued

| Example # | ID of Reactor | ID of Mullite Feed Tube | Type of Feed Tube | Orientation of Reactor | Average Yield | Product Density (grams/cc) |
| --- | --- | --- | --- | --- | --- | --- |
| 4 | 10 cm | 19 mm | Mullite | Horizontal | >35% | 0.002 |

NOTE:
In Example 1, a ferrocene/hexane solution was used.
In Examples 2, 3 and 4 iron pentacarbonyl was used.
Examples 2, 3 and 4 include purge steps.
> indicates value is greater than number shown.

EXAMPLE 2

The apparatus of the invention as shown in FIG. 3 was used in a preferred method to form carbon fibers which included a series of fiber forming steps immediately followed by a forced purge under pressure (blow-out purge) and then an oxidation purge. In the first step, helium gas at a flow rate of 200 cc/min was supplied by compression and flow control system 41 to reservoir 42 through line 43. In reservoir 42, the helium was bubbled through liquid iron pentacarbonyl at 22° C. Next, a reactant gaseous stream comprising methane was supplied from controller 39 through line 40. The helium/carbonyl gas stream flowed into lines 44 and 46. The helium/iron carbonyl gas mixture in line 46 and gaseous reactants supplied through line 40 were mixed at tee 48 before entering reactant feed tube 20. The gaseous reactants in line 40 were methane at 4740 cc/min, air at 3160 cc/min, and hydrogen sulfide at 12.8 cc/min.

The flow of reactants and growth of fibers continued for about four minutes at a temperature of about 1050° C. to 1120° C. The reactor was then purged by force of helium under pressure in excess of the average pressure observed during fiber growth. The flow rate of helium was sufficient to achieve a pressure in excess of atmospheric, or 800 Torr, in the reactor using several short bursts of helium supplied at 30 psig. The reactor was then purged with oxygen in air to oxidatively remove any carbonaceous material including fibers and other unreacted constituents. The oxidizing purge utilized air at a flow rate of 5900 cc/min for about three minutes.

The process was repeated over a period of about five hours during which the yield of fibers produced was maintained at a consistently high level of about 25 percent to 30 percent. There was no reduction in fiber quality during the five hour period. That is, fibers of 50 nm to 100 nm in diameter and one or more micrometers in length and about 0.002 gm/cc were consistently formed at a consistently high yield.

EXAMPLE 3

The apparatus 10 which included a horizontal reactor as shown in FIG. 4 was used to form carbon fibers in a preferred method. The method used was similar to that of Example 2 except that the gaseous mixture flowed in a generally horizontal direction through feed tube 20, expanded into chamber 102 and flowed out through exhaust line 120 at outlet 112 of chamber 102.

The reactant gas flow rates were as follows: methane at 4740 cc/min, air at 4670 cc/min, hydrogen sulfide at 13 cc/min and helium gas bubbled through liquid iron pentacarbonyl at 137 cc/min.

Fibers were formed for a period of about four minutes followed by a short forced purge with helium gas and an oxidation purge with air for three minutes at 4670 cc/min.

Six continuous cycles of operation were conducted during a period of less than about one hour, with each formation step being followed by the purge steps, in sequence, six times. During the six cycles, an average yield of 23 percent was obtained with fibers having a density of about 0.003 gm/cc.

EXAMPLE 4

The apparatus 10, which included a horizontal reactor as shown in FIG. 4, was used in a method similar to that of Example 2, except that no oxygen was used during the fiber formation phase, and natural gas was used as the source of carbonaceous material. The flow of the helium/iron pentacarbonyl stream was started two minutes or more before the flow of methane was commenced.

The reactant flow rates were as follows: natural gas at 4740 cc/min, hydrogen sulfide at 13 cc/min and helium with iron pentacarbonyl at 137 cc/min.

Fibers were formed for a period of about four minutes followed by a forced purge with air to move remaining fibers out of the reactor and an oxidation purge with air at 4670 cc/min for three minutes to oxidize any remaining oxidizable constituents.

Sixteen continuous cycles of fiber formation and purge were conducted. During the 16 cycles, an average yield of 35 percent was obtained. The fibers had an average density of about 0.002 gms/cc.

During the 16 cycles, the temperature ranged from 1100° C. to 1120° C. At the higher temperature, the yield was higher and the density was lower, as compared to fibers formed at lower temperatures.

The forced and oxidizing purges produced yields which were consistently high over a period of time and produced fibers which had a consistent density of 0.001 to 0.003 gm/cc.

It should be noted that acceptable fibers were formed without including oxygen in the reaction. It was determined that desirably no more than 70 percent by volume of air or 15 percent by volume of oxygen should be used; preferably an amount of 0 to 55 percent by volume of air is used.

Although not wishing to be limited to any particular theory, we believe the following is the theoretical explanation of fiber formation in the apparatus of the invention. Ferrocene and iron pentacarbonyl decompose and nucleate into iron particles in the feed tube 20. Microscopic carbon filaments can grow from nuclei of iron and have a diameter of about 5 nm. This is believed to be the optimum nucleus size for growing fibers. In the carbon-rich environment within the reactor 12 and reactor 100, it is likely that carbon filaments (fiber precursors) lengthen for a relatively short time before each nucleus is buried by excess carbon products. Filament lengthening should not be appreciable in the feed tube 20 because the tube may become blocked. The lengthening period is always, of course, less than the period of time each nucleus spends in the reactor 12,100. Once the filaments reach the larger diameter chamber 14,102 their linear flow (velocity) slows down and the filaments may lengthen and thicken for a relatively longer period of time, forming fibers in chamber 14,102 before they reach the outlet 18,112.

In the vertical reactor 12, as the filaments thicken, they move downward in the larger diameter chamber 14 so their motion will be assisted by gravity. As the fibers and accompanying gases leave the furnace 34, they cool as they flow downward, avoiding convective currents which would occur if the fibers exited at the top. Therefore, the vertical reactor 12 is constructed and arranged so that convection is minimized by suspending hot gases over cold. This is an important advantage.

It should be noted that the vertical reactor as shown in FIG. 1 through 3 provides important advantages as compared to a horizontal reactor. The advantages include: minimized convective effects, minimum thermophoretic losses of the all-important catalytic particles, efficient heat transfer from exhausting to incoming gases, and gravitationally assisted collection of the fibers. As gaseous flow rates increase, most of these advantages diminish.

Despite the advantages achieved by the vertical reactor, the horizontal reactor is operable by the method of the invention so as to achieve results approaching the results obtained in the vertical reactor. More frequent pressurized purge is thought to be required when using a horizontal reactor.

It is believed that a key factor in improving fiber growth is the construction and arrangement of the feed tube 20 and reactor chamber 14, which provides conditions conducive for fiber growth, particularly when liquid reactants, such as the hexane/ferrocene solution, are used. Hexane is suitable for this process because it has a relatively low heat of vaporization and a high vapor pressure, which means cooling adjacent the inlet 22 of feed tube 20 is minimized.

The optimum flow of the hexane/ferrocene liquid solution is believed to be about 4.5 cubic centimeters per minute in the apparatus 10, shown in FIGS. 1, 2 and 3, with a ferrocene concentration in the solution greater than 0.6 grams for every 100 cubic centimeters of hexane. At that flow rate, the hexane was effectively dispersed in the mixture of gases.

In the case of iron pentacarbonyl, at a total gas flow rate of 10 liters/minute (1/m), a flow of helium of about 75 cc/min through the iron pentacarbonyl was sufficient to produce an acceptable yield. However, yield somewhat increased and growth became more consistent as the supply of iron pentacarbonyl to the reactor increased. It is preferable to start the flow of the nuclei-containing compound (ferrocene or iron pentacarbonyl) prior to flowing the carbonaceous material into the reactor. In this sequence, the nuclei are transported into the hot zone first and available to react with the carbonaceous material subsequently supplied. The reactor chamber and feed tube of mullite with dimensions as shown in Table 1 provided acceptable fiber quality at a total gaseous reactant flow rate of up to about 28 liters/minute and as low as less than about 1 liter/minute. Best results were obtained in the range of 5 to 15 liters/minute.

Below 1000° C., dense sooty material was produced. Over 1050° C., the desired low density microscopic fiber material were produced. The apparatus 10 could not be operated at a hot enough temperature to define a clear maximum temperature of fiber growth. Generally, as the temperature increased there was an increase in the efficiency of conversion of the reactants to carbon products, that is, the yield of fibers increased with increasing temperature. This more efficient conversion was accompanied by an increasing tendency toward inlet tube clogging.

Some of the nuclei are incidentally deposited on the inner surface of the inlet tube where they can catalyze the growth of filaments. Because the nuclei remain fixed in the reactor, they can grow fiber of extraordinary length, ultimately blocking the inlet tube. As they increase in length, they form a porous, intertwined filter which can remove catalytic particles from the inlet stream, drastically decreasing the yield. The purpose of the oxidative purge is to burn the intertwined carbonaceous material from the inlet tube to render it productive once again.

Other conditions which contributed to the formation of acceptable fibers included providing a quantity of sulfur by weight which is approximately equal to the quantity of iron nuclei, and providing oxygen in the feed stream. Oxygen etches away the fibers growing in the inlet tube and reactor which could filter out incoming iron particles or ultimately block all incoming gases. It should be noted that insufficient oxygen for complete combustion was provided. However, even partial oxidation of the incoming hydrocarbons diminished the clogging compared to what would have existed in the absence of oxygen. Carbon fiber yield could be improved when a relatively small amount of oxygen is introduced. Desirably less than the stoichiometric amount is used. Preferably, no more than about 50 percent to 70 percent by volume of air is used. Although it is feasible to operate with essentially no oxygen, more frequent purges may be required.

Conveniently, we used natural gas as the source of carbonaceous material. Natural gas with a relatively high proportion of methane and ethane is preferred. Methane and natural gas may also be used in place of more expensive helium for dispersion of iron pentacarbonyl. That is, methane and/or natural gas may be bubbled through the reservoir containing iron pentacarbonyl.

The quality of fiber product may be roughly assessed by measuring its apparent density. This parameter is very useful for monitoring and optimizing fiber production in apparatus of the invention. For example, the apparent density of soot produced with no nuclei material present was well over 0.02 grams per cubic centimeter. Fibrous material, however, is much less dense, that is, near 0.002 gram per cubic centimeter. Thus, density measurements are useful for discriminating between microscopic fibers and soot. Low densities always correlated with high quality fibers. This was verified by beginning the process as described in Example 2 above, with no iron pentacarbonyl, and progressively adding iron pentacarbonyl until the density dropped to about 0.002 grams per cubic centimeter. Adding more than 100 cc/min of helium bubbled through iron carbonyl at 20° C. did not further improve the density. Densities of fibers produced under the optimized conditions are as presented in Table 1.

The apparatus 10 of the invention provided for continuous growth of carbon fibers while minimizing thermophoretic and convective losses. That is, the apparatus 10 of the invention minimizes the loss of heat and particularly the loss of the ability of the reactants to undergo reaction due to the loss of heat. The apparatus 10 maximized production of microscopic carbon fibers and minimized the production of soot and fibers of undesirable dimensions.

Thus, the invention provides a continuous process and apparatus for forming carbon fibers in a gas phase reaction, improves the process of forming microscopic carbon fibers, permits the continuous formation of fibers in a continuous reaction while essentially steadily maintaining desired reaction conditions, minimizes undesirable convective currents, increases the yield of carbon fibers, minimizes thermophoretic wastage of feedstock, substantially eliminates soot, increases the proportion of smaller, microscopic fibers and decreases the cost of producing fibers.

While this invention has been described in terms of certain embodiments thereof, it is not intended that it be limited to the above description but rather only to the extent set forth in the following claims.

What is claimed is:

1. A method of continuously forming carbon fibers in a reactor having an inlet and an outlet and a passageway therebetween comprising:
   a) forming a mixture comprising a gaseous carbonaceous compound and a decomposable iron-containing compound;
   b) flowing the mixture through the passageway in the reactor through a first flow path confined within a second flow path leading to a heating zone while maintaining the flowing mixture at a first pressure, a first temperature and at a first velocity sufficient to thoroughly entrain the iron-containing compound for dispersion into the heating zone;
   c) heating the mixture in the heating zone by simultaneously heating both of the flow paths from a surrounding heat source external of the second path at a second temperature greater than the first temperature to provide particles consisting essentially of an iron-containing decomposition product of the iron-containing compound the particles being of nanometer size and dispersed and entrained in the gaseous mixture, and also to cause carbon fiber growth on said particles;
   d) flowing the mixture through the second flow path to change the velocity of the flowing mixture in the heating zone with the particles entrained therein to a second velocity less than the first velocity to enhance carbon fiber growth on the particles;
   e) cooling the gaseous mixture flowing through the second flow path with the fibers entrained therein to a third temperature less than the second temperature in a cooling zone beyond the heating zone; and
   f) from the cooler and lower velocity gaseous mixture continuously recovering the entrained carbon fibers formed on the particles in the reactor.

2. The method according to claim 1 wherein the mixture of step (a) comprises:
   (a) the gaseous carbonaceous compound being at least one selected from the group consisting of methane, ethane and ethylene;
   b) the iron-containing compound being iron pentacarbonyl; hydrogen sulfide; and
   d) up to an amount of oxygen sufficient to partially oxidize the gaseous carbonaceous compound.

3. In a method for preparing carbon fibers in a gas phase reaction, the improvement comprising introducing a gaseous mixture comprising a gaseous carbonaceous compound and a decomposable iron-containing compound into a reactor having an inlet, an outlet and a passageway therebetween defining first and second flow paths in Which the first flow path is co-extensive with at least a 50% portion or the second flow path and is encompassed by the second flow path; flowing the mixture in the passageway in the reactor through the first flow path and then through the second flow path; changing the velocity of the mixture from a first velocity in the first flow path to a second velocity in the second flow path where the second velocity is less than the first velocity; and heating the reactor to establish a hot zone within the reactor and a relatively cool zone adjacent the reactor outlet to create a first temperature adjacent the inlet, a second temperature greater than the first temperature within the hot zone to heat the first and second flow paths, decompose the iron-containing compound to provide particles of an iron-containing decomposed product and to sustain fiber growth, and a third temperature less than the second temperature adjacent the outlet to terminate fiber growth or to minimize convective currents within the reactor.

4. The method according to claim 3 wherein the mixture of step (a) comprises:
   a) the gaseous carbonaceous compound being at least one selected from the group consisting of methane, ethane and ethylene;
   b) the iron-containing compound being iron pentacarbonyl;
   c) hydrogen sulfide; and
   d) up to an amount of oxygen sufficient to partially oxidize the gaseous carbonaceous compound.

5. The method according to claim 3 and further including intermittently interrupting the flow of the gaseous mixture and flowing a gas stream consisting essentially of nitrogen through the reactor at a pressure sufficient to forcibly move at least a portion of any carbonaceous material clogging the reactor passageway out of the reactor; and then during the interruption, flowing an oxygen-containing gas through the reactor to oxidize any remaining carbonaceous material in the reactor.

6. In a process for preparing carbon fibers in a gas phase reaction, the improvement comprising introducing a gaseous mixture comprising a gaseous carbonaceous compound and a decomposable iron-containing compound into a reactor having an inlet, an outlet and a passageway therebetween defining first and second flow paths in which the first flow path is co-extensive with at least a portion of the second flow path and is encompassed by at least a portion of the second flow path; flowing the mixture in the passageway in the reactor through the first flow path and then through the second flow path; changing the velocity of the mixture from a first velocity in the first flow path to a second velocity in the second flow path where the second velocity is less than the first velocity; and heating the reactor to establish a hot zone within the reactor and a relatively cool zone adjacent the reactor outlet to create a first temperature adjacent the inlet, a second temperature greater than the first temperature within the hot zone to heat the first and second flow paths, decompose the iron-containing compound to provide particles of an iron-containing decomposed product and to sustain fiber growth, and a third temperature less than the second temperature adjacent the outlet to terminate fiber growth or to minimize convective currents within the reactor; and intermittently interrupting the flow of the gaseous mixture and flowing a purge gas stream through the reactor at a pressure sufficient to forcibly move at least a portion of any carbonaceous material clogging the reactor passageway out of the reactor; and then during the interruption, flowing an oxygen-containing gas through the reactor to oxidize any remaining carbonaceous material in the reactor.

7. The method according to claim 6 wherein the purge gas stream consists essentially of nitrogen.

* * * * *